March 10, 1936.　　　　G. MEZ　　　　2,033,439
CALCULATING MACHINE
Filed June 29, 1929　　　11 Sheets-Sheet 1

Figure 1:
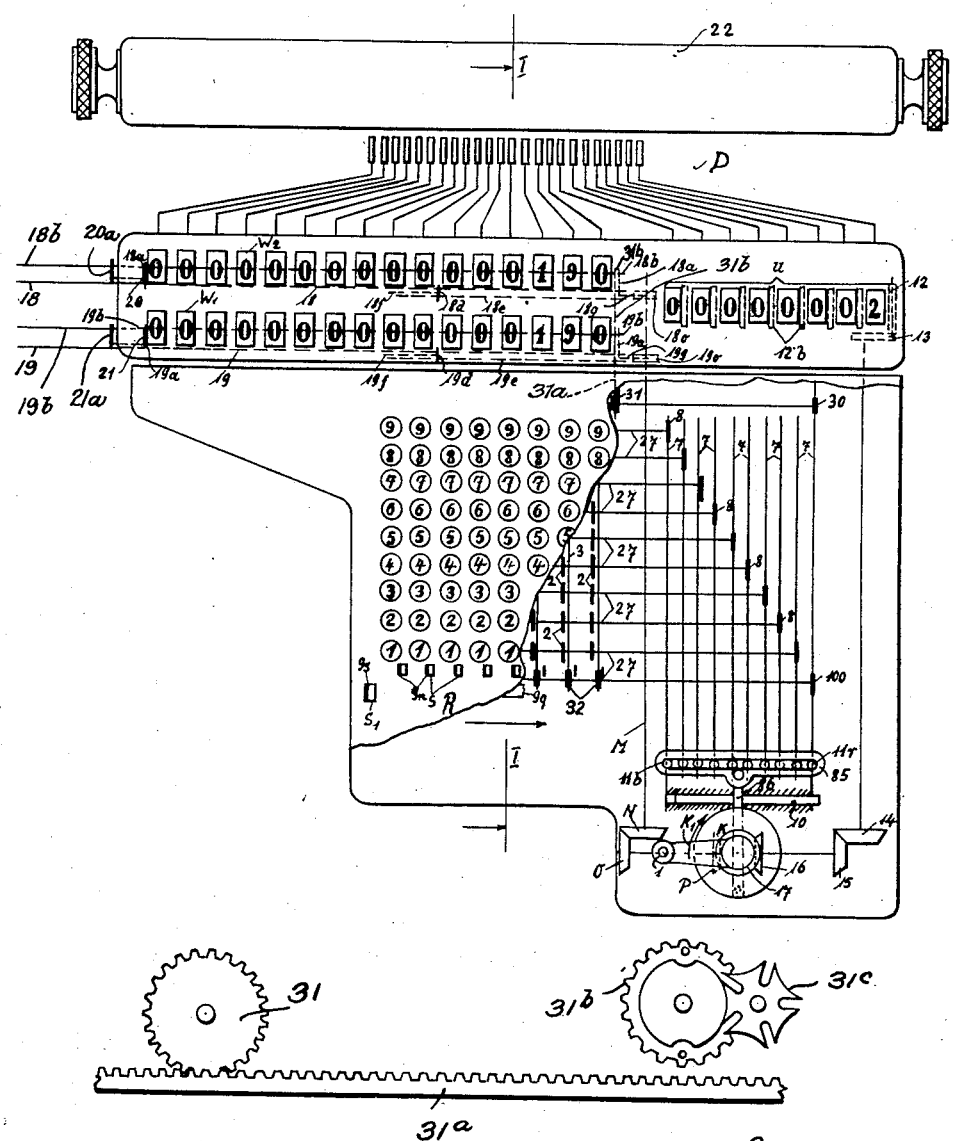

*Fig. 1.ᵈ*

March 10, 1936.  G. MEZ  2,033,439
CALCULATING MACHINE
Filed June 29, 1929   11 Sheets-Sheet 2
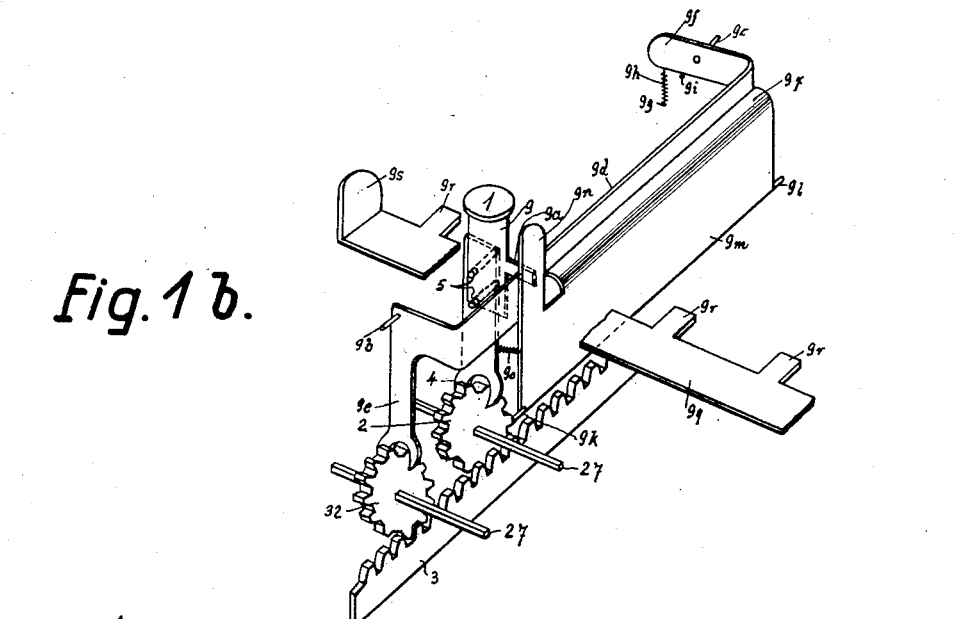
Fig. 1b.
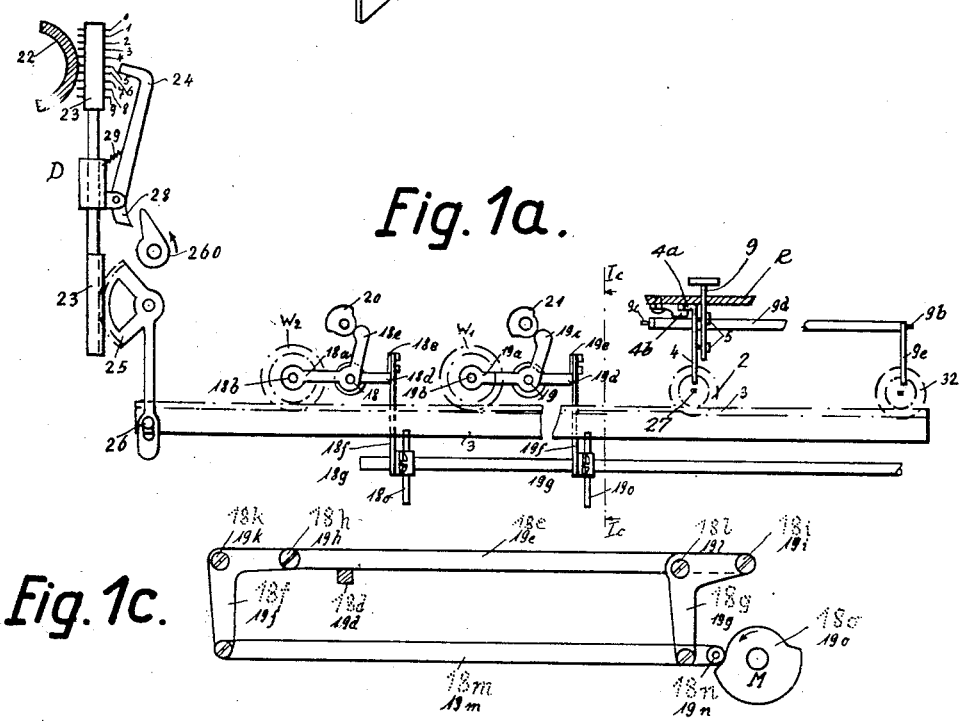
Fig. 1a.
Fig. 1c.

March 10, 1936.  G. MEZ  2,033,439
CALCULATING MACHINE
Filed June 29, 1929   11 Sheets-Sheet 3

Inventor
Gustav Mez
By Knight Bros
Attorneys

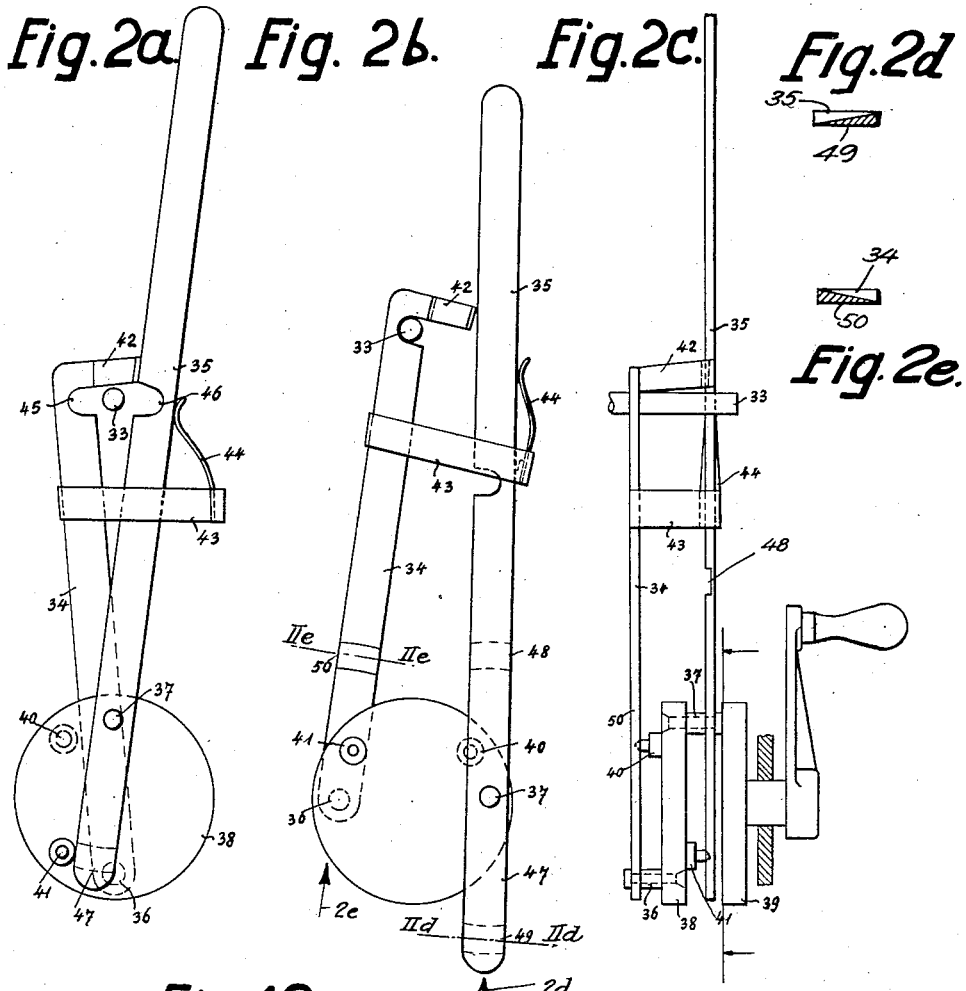
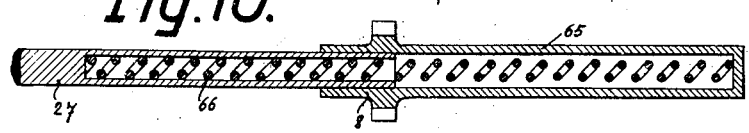
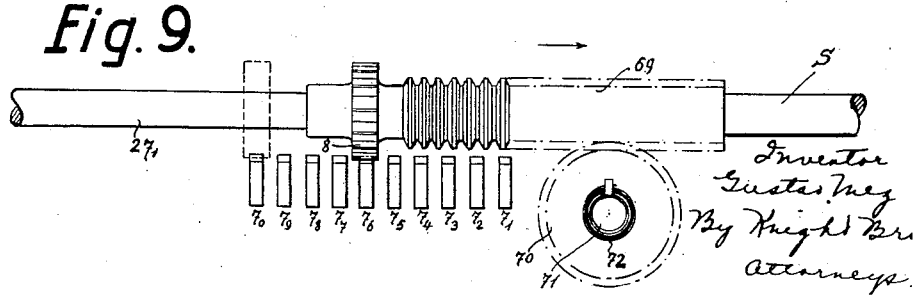

March 10, 1936. G. MEZ 2,033,439
CALCULATING MACHINE
Filed June 29, 1929 11 Sheets-Sheet 5

March 10, 1936.  G. MEZ  2,033,439
CALCULATING MACHINE
Filed June 29, 1929   11 Sheets-Sheet 6

March 10, 1936.    G. MEZ    2,033,439
CALCULATING MACHINE
Filed June 29, 1929    11 Sheets-Sheet 7
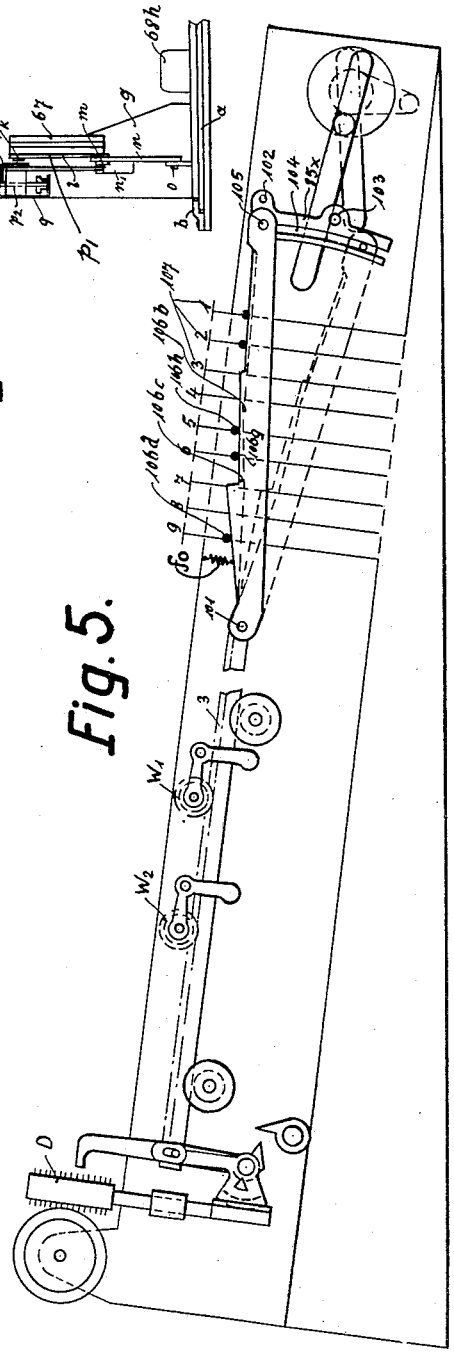
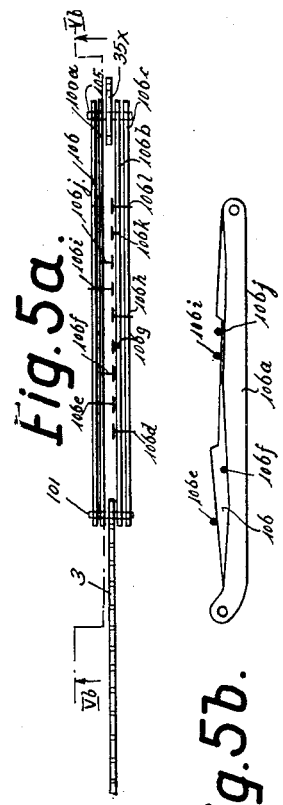
Inventor
Gustav Mez
By Knight Bros.
Attorneys March 10, 1936.    G. MEZ    2,033,439
CALCULATING MACHINE
Filed June 29, 1929    11 Sheets-Sheet 8
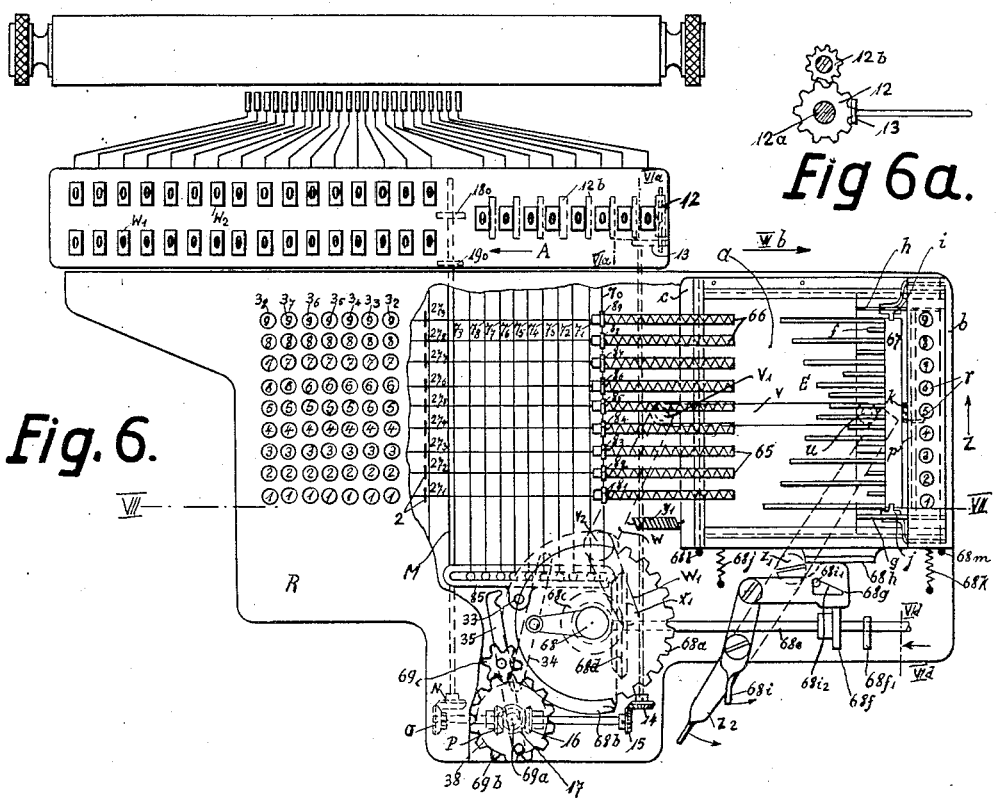
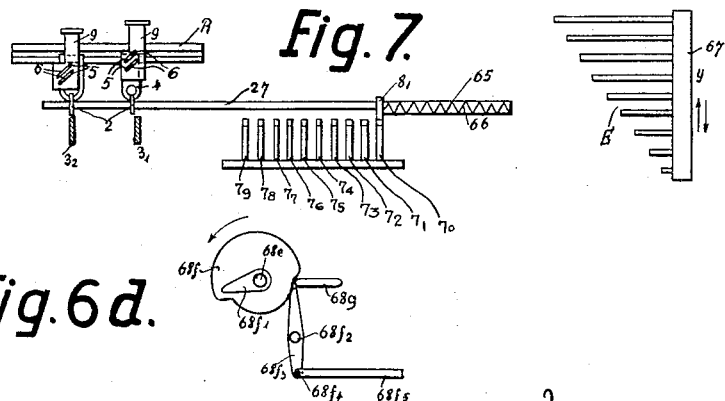

March 10, 1936.  G. MEZ  2,033,439

CALCULATING MACHINE

Filed June 29, 1929  11 Sheets-Sheet 9

March 10, 1936.  G. MEZ  2,033,439
CALCULATING MACHINE
Filed June 29, 1929  11 Sheets-Sheet 11

Inventor
Gustav Mez
By Wright Bro.
Attorneys

Patented Mar. 10, 1936

2,033,439

UNITED STATES PATENT OFFICE 2,033,439

CALCULATING MACHINE

Gustav Mez, Dahlem, near Berlin, Germany, assignor to Mercedes Büromaschinen-Werke Aktiengesellschaft, Benshausen, Germany Application June 29, 1929, Serial No. 374,813
In Germany August 27, 1924

27 Claims. (Cl. 235—73)

This invention has reference to calculating machines adapted for the carrying out of the four fundamental species of calculation, and it refers in particular to machines of the kind disclosed in the patent to Christel Hamann No. 1,011,617 dated Dec. 12th, 1911, which are provided with rotating counting mechanism and operating members to be actuated by so-called proportional levers and the operation of which is transmitted by means of adjustable wheels to the actuating parts of the counting mechanism. The present application is a continuation-in-part of my prior application, Serial No. 52,647, filed August 26, 1925, for Calculating machines. Machines of this kind in accordance with the previous art are generally of complicated construction, and their manipulation is difficult and time-consuming and in view of their complicated construction, such machines were rather expensive, their operation was unreliable, and they frequently failed to respond and to operate.

Now in accordance with this invention, hereinafter to be described these and other objections of the previous art are overcome by arranging the driving members of the counting mechanism, so as to be movable in their axial direction, while the operating members are adapted to be movable in a plane at right angles to the longitudinal direction of the driving members of the counting mechanism, the keys and the intermediate connecting members being, however, stationarily arranged. The counting wheels which, in the well known manner, are mounted upon a common shaft are so disposed that their axis is at right angles to the direction of movement of the driving members of the counting mechanism. The operating members may be formed by rods, bars, plates or the like adapted to be moved by the so-called proportional levers, and they may be connected by gear wheels, pawls or the like with any particular driving member of the counting mechanism.

Instead of the proportional lever disclosed by the previous art which for the purposes of this invention is operatively connected to four-cornered shafts, each of which is adapted to displace through a certain distance a rack bar which is in operative engagement with the counting mechanism, the invention admits also of the utilization of any other means for producing a proportional movement, such as, for instance, lazy-tongs or the like. The manner of producing the movement in the particular case will appear from the following description of the invention.

In order to arrive at a more compact arrangement of the different parts of the machine, particularly in case the driving mechanism and the setting mechanism are arranged adjacent to each other, the proportionally moved rods or bars may be replaced by plates or the like which are adapted to be proportionally operated in exactly the same manner as in other systems of the kind referred to, but which may be arranged above each other. This particular kind of construction will be subsequently described with reference to Figures 3, 4 and 4a of the drawings. The compact construction of the machine is produced in this system by mounting the setting mechanism above the driving mechanism instead of side by side with the same, as in previous constructions. Then, there is the additional advantage that with this arrangement the crank drive, instead of being disposed at the top of the machine, may be arranged at the side thereof. Where the crank drive is disposed on the top of the machine, there is the inconvenience that the operator in manipulating the crank sometimes covers up the result with his hand and his sleeve, which is a serious disadvantage. However, whenever desired, there is no objection to the mounting of the crank on top in accordance with my invention, suitable intermediate gearings being employed for the purpose of allowing the otherwise laterally arranged crank to be transferred from its lateral position to the top of the machine, as usual. The invention will be more fully described with reference to the accompanying drawings which show by way of exemplification and diagrammatically several forms of embodiments of the main principles of this invention, without however limiting the invention to these particular constructions.

Figure 2:
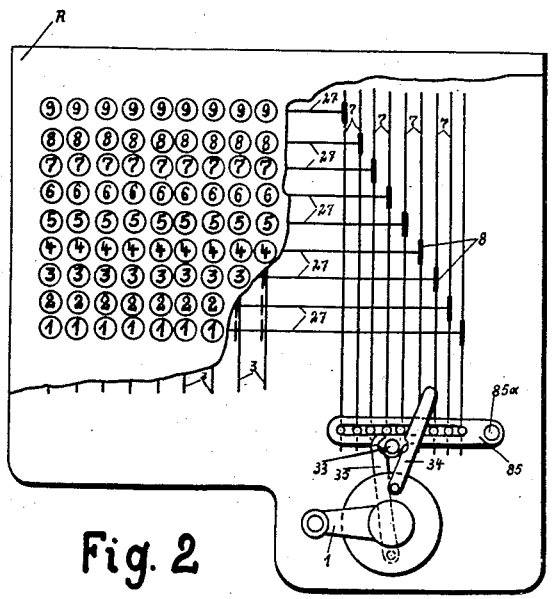

In the drawings:—Figure 1 represents a calculating machine in accordance with this invention with double result mechanism, and with revolution counting mechanism and with a printing device. Figure 1a represents an elevation of the machine with parts in section on the line I—I of Figure 1. Fig. 1b is a perspective view of the key locking and releasing mechanism. Fig. 1c is a section on the line Ic—Ic of Fig. 1a, some parts being omitted for the sake of clearness. Fig. 1d is a fragmentary side elevation of the right hand end of the result mechanism, showing a part of the fugitive 1 mechanism. Figure 2 is a representation of another modified construction with special reversing means for the driving mechanism, the result-producing mechanism, which may be identical with the one shown in Figure 1, being omitted for the sake of clearness; and it is also omitted in the other figures. Figures 2a, 2b and 2c show the reversing mechanism on an enlarged scale and in two different positions. Fig. 2d is a cross section along line IId—IId of lever 35 seen in the direction of the arrow 2d of Fig. 2b. Fig. 2e is a cross section along line IIe—IIe of lever 34 seen in the direction of the arrow 2e of Fig. 2b.

Figure 8:
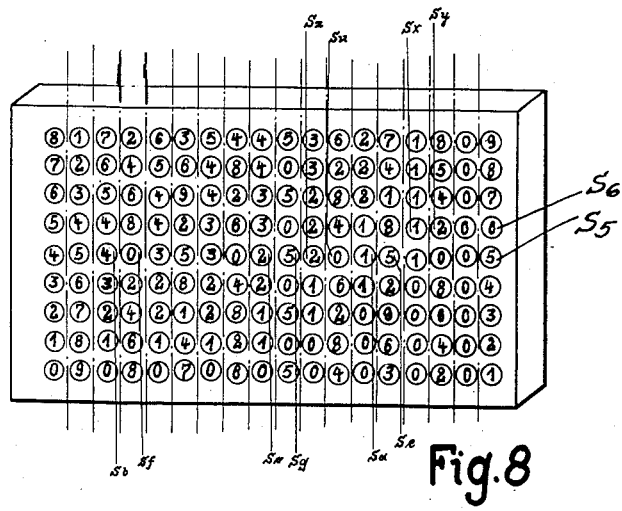
Figure 3:
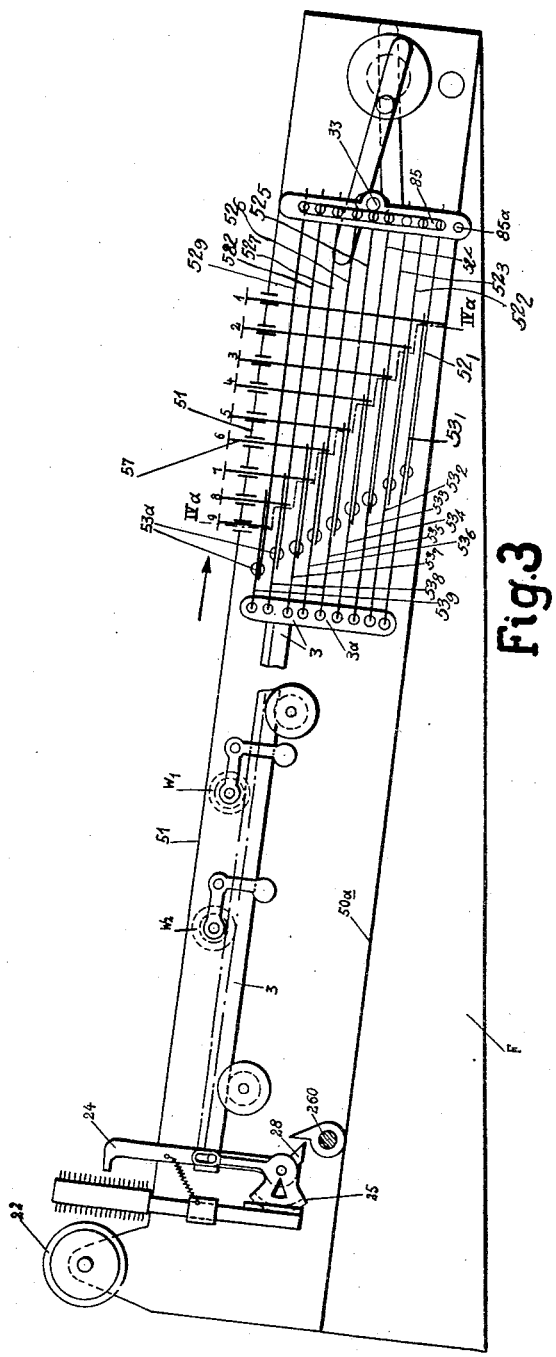
Figure 4:
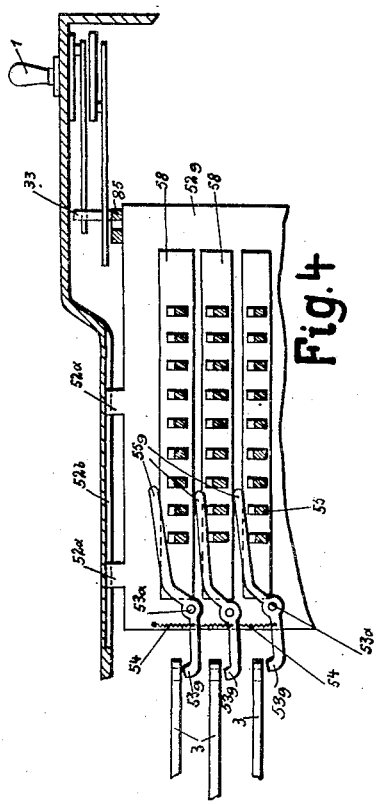
Figure 4A:
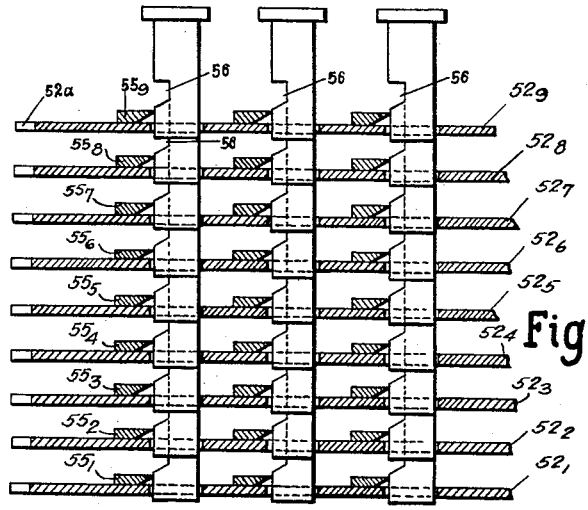
Figure 4B:
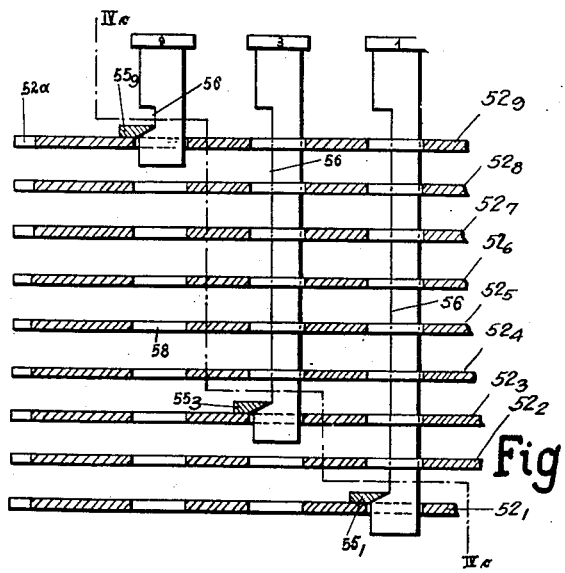
Figure 4C:
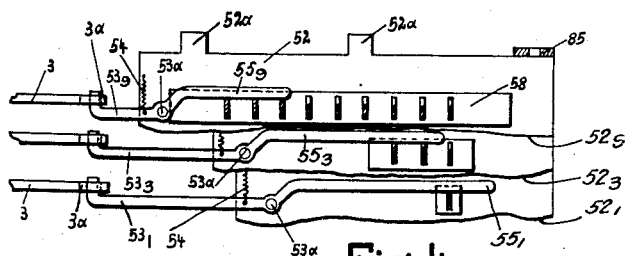
Figure 6F:
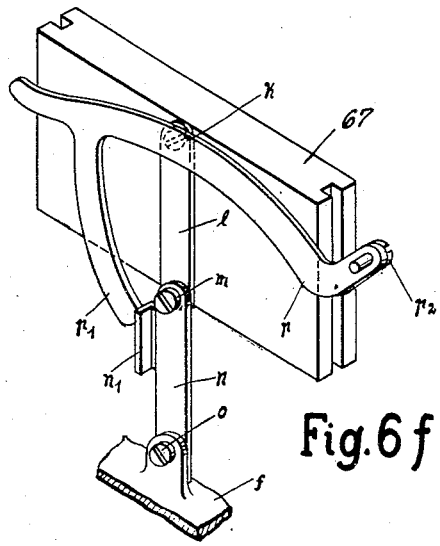
Figure 6G:
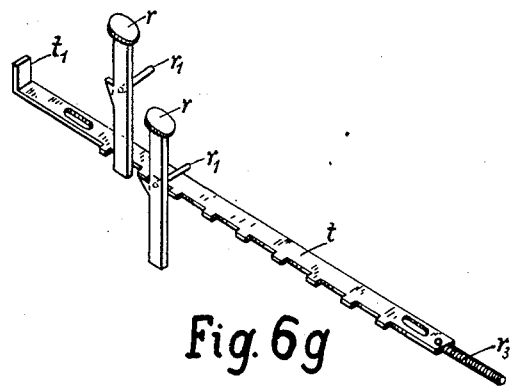
Figure 6E:
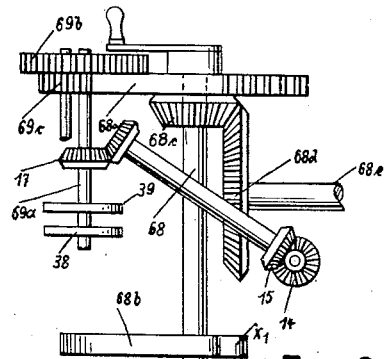
Figure 6B:
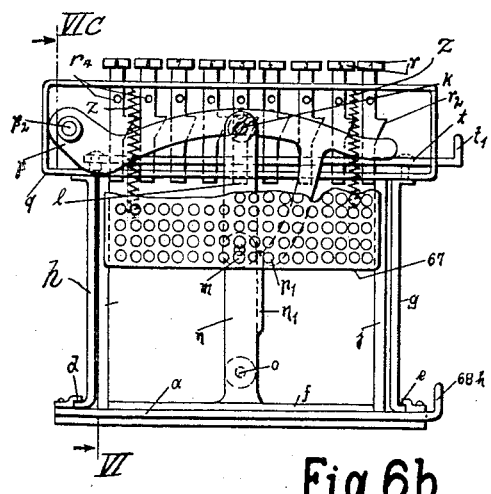
Figure 9A:
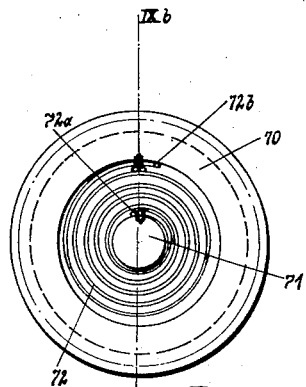
Figure 9B:
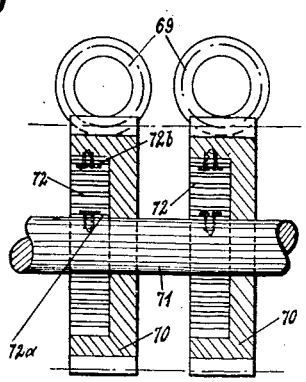
Figure 6H:
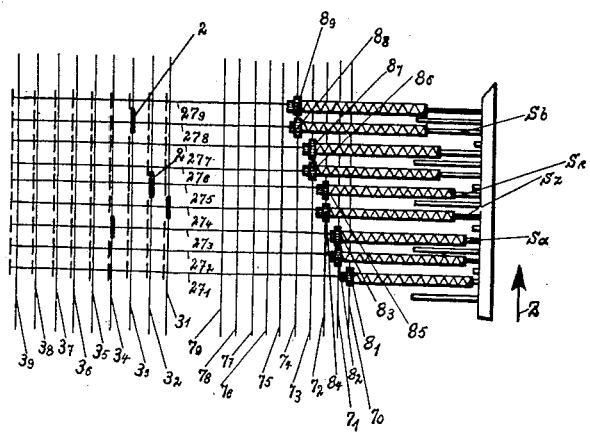
Figure 6I:
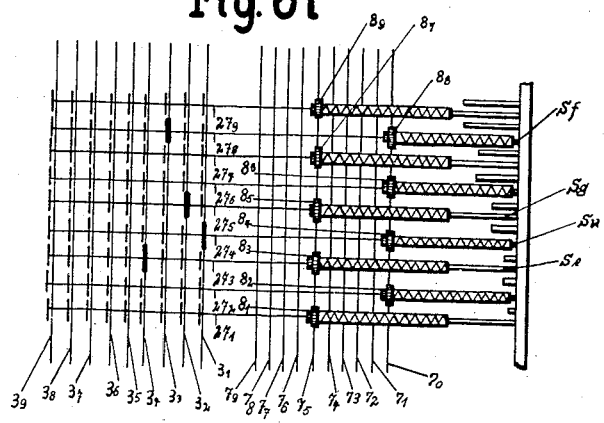
Figure 11:
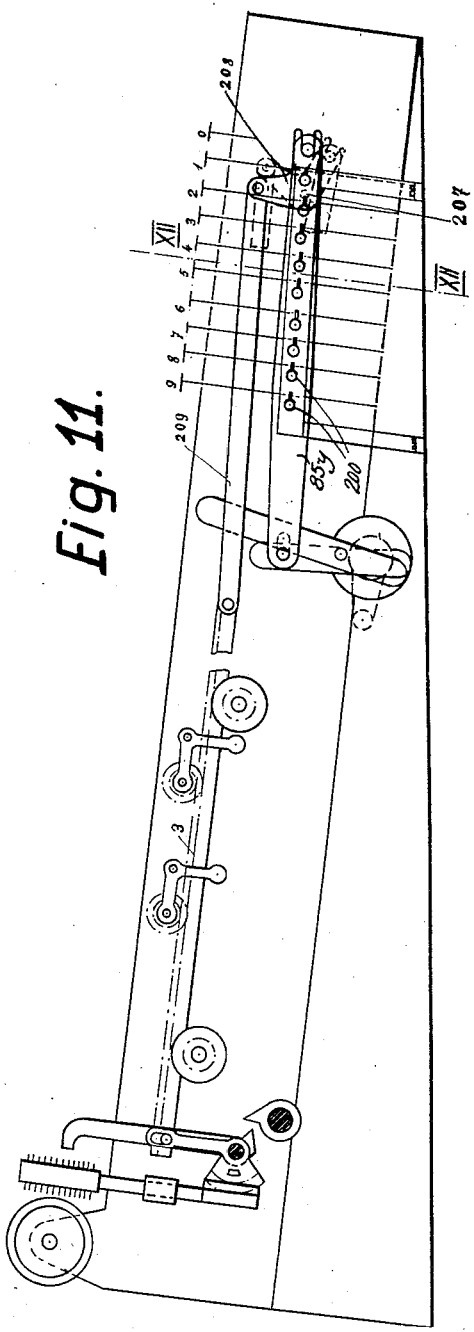
Figure 12:
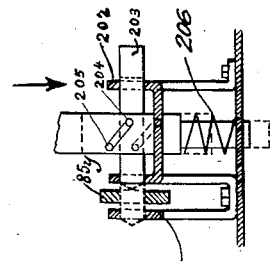

In Figures 3 and 4 another modified construction of the invention is shown diagrammatically, and respectively in elevation and in plan view. Fig. 4a shows a fragmentary cross section according to line IVa—IVa of Fig. 3 on an enlarged scale and seen in the direction of the arrow in Fig. 3. Fig. 4b shows the same view, wherein the keys, representing the amount "139" are in depressed position and all other keys or keystems are omitted for the sake of clearness. Fig. 4c shows a top view along the section line IVc—IVc of Fig. 4b on the same scale as Fig. 4 with the keys, representing the amount "139", in depressed position. Figure 5 is an improvement of the construction shown in Figures 3 and 4. Fig. 5a is a plan view of the swinging frame, operated by the keys 107 as shown in Fig. 5. Fig. 5b is a section on the line Vb—Vb of Fig. 5a. In Figure 6 a modification is shown in which for the purpose of direct multiplication a multiplication-table body is used. Fig. 6a is a section on the line VIa—VIa of Fig. 6 showing in elevation the driving mechanism for the revolution counting device. Fig. 6b is an elevation of the multiplication body E and its operating mechanism on an enlarged scale taken in the direction of the arrow VIb of Fig. 6. The multiplication body is partly broken away in this figure to reveal other parts. Fig. 6c is a section on the line VIc—VIc of Fig. 6b. Fig. 6d is a section on the line VId—VId of Fig. 6, the scale being somewhat larger. Fig. 6e shows a fragmentary side view of the driving mechanism, seen in the direction from the bottom edge of the sheet of Fig. 6. Fig. 6f shows a perspective view of parts of Figs. 6b and 6c, seen from the left in Fig. 6c. Fig. 6g shows a perspective view of the key locking means for the multiplier keys r with one of these keys in depressed position, also seen from the left in Fig. 6c. Fig. 6h shows a diagrammatic view of the setting position of the multiplication table body when the tens pins of the pin row which correspond to the multiplier "5" are in operative position. Fig. 6i shows the same view but with the units pins of that pin row in operative position. In Figure 7 the machine according to Figure 6 is shown in section on the line VII—VII of Figure 6. In Figure 8 is shown a perspective view of the multiplication-table body employed according to Figure 6. For the sake of clearness, the different lengths of the studs of the multiplication-table body are not illustrated in Fig. 8, but are merely represented by open circles, the numbers in which indicate the number of units of length of the several studs. The figures 9 and 10 represent accessory details to be referred to. Fig. 9a is a side view of the wheel 70 of Fig. 9 but on an enlarged scale. Fig. 9b shows a cross section according to line IXb—IXb of Fig. 9a. Figure 11 is a representation of another modified construction in which the longitudinal movement of the parts acted upon by the keys, and occurring in connection with the modifications of Figures 3 to 5, has been advantageously avoided. Figure 12 shows details on an enlarged scale in sectional view on the line XII—XII according to Figure 11.

The driving mechanism according to Figures 1, 2 and 6 is of the type shown in U. S. Patent 1,011,617, and a more detailed description thereof has therefore been omitted. The usual rack bars, indicated at 7 are acted upon by the lever 85 through pivotal connections 11b—11r, so as to produce the proportional longitudinal movements, for addition after the right hand bar 7 has been arrested by the displacement of the locking pin 10 towards the right, while for subtraction the left hand rack bar 7 has been arrested by the displacement of the locking pin 10 towards the left. The displacement of the locking pin 10 may be performed in any possible way as for instance in the manner shown in U. S. Patent 1,011,617, Figs. 2 and 5, pin 2. By this proportional longitudinal movement of the rack bars 7 a corresponding rotational movement is imparted to the shafts 27 disposed at right angles to the rack bars, by means of the small gear wheels 8.

The said proportional lever 85 is rocked by means of the crank 1 to which it is connected by the link 86. One of the advantages of this arrangement resides in the smooth operating movement of the rack bars which commence their movement rather imperceptibly, so to speak, that is to say, without rattling and jarring movement, the rack bars being stopped just as smoothly and without sudden jar. In the form of construction according to Figure 1 the shafts 27 are preferably of square or rectangular cross section, and these shafts carry at the left portion thereof as many small gear wheels 2 as correspond to the number of vertical rows of keys, so that one small gear wheel 2 corresponds to every key. Each vertical row of keys has keys from 1 to 9. Underneath the key board and below the shafts 27 and at right angles to the latter are disposed a number of rack bars 3 corresponding to the number of vertical rows of keys. In the position of rest of the machine the said small gear wheels 2 are disengaged from the rack bars 3, while they are engaged therewith only upon the depression of the corresponding key, thus for instance, by the longitudinal displacement of the gear wheels 2 along the shaft 27 by means of the device shown in Figures 1b and 7 of the drawings.

Every single small gear wheel 2 is loosely embraced by the downwardly forked member 4, the upper edge of which bears directly upon the inner wall of the casing R (Fig. 7) of the calculating machine. The member 4 carries the pins 5 engageable with the inclined slots 6 of the key carrying member 9. At the upper end of the part 4, a lug 4a (Fig. 1a) is bent off from it, which slidably rests upon a bar 4b, common to all keys of the same value and fixed to the wall of the casing R. Upon the depression of one of the keys (the left hand key in Figure 7) the engagement of the pins 5 of the member 4 with the inclined slots of the part 9 produces the axial displacement of the part 4 which is held against vertical displacement by the bar 4b. Consequently the gear wheel 2 is displaced along the shaft 27 to an extent sufficient for the engagement with the corresponding rack bar 3. Upon depression of any of the keys 9 in the same row a projection 9a on the key shaft 9 (Fig. 1b) comes into contact with a yoke 9d which is pivotally mounted at the points 9b and 9c. This yoke is provided at its forward end with an arm 9e projecting vertically downward, which embraces a small wheel 32, the function of which will be described in detail later on. The rearmost arm 9f of yoke 9d is extended to the left as seen in Fig. 1b beyond the pivot 9c. To this extension is fastened one end of the spring 9h, the other end of which is secured to the machine frame at 9g; this spring tends to hold the yoke 9d against a pin 9i. By this arrangement the keys are normally held in their uppermost positions. This arrangement is provided for each row of keys. There is further provided for each row of keys a locking plate 9m of shaped cross section which is pivoted at the points 9k and 9l. Each locking plate has an upward projecting tongue 9n which projects through apertures s (Fig. 1) in the cover plate R. Springs 9o tend to swing the locking plate 9m in counter clockwise direction. This swinging movement is limited by the engagement of the tongue 9n with the left edge of the aperture s. The horizontal leg 9p of the key locking plate lies in the path of projection 9a. If a key 9 is depressed, the projection 9a thereof causes yoke 9d and key locking plate 9m to swing in clockwise direction. After the projection 9a has passed the horizontal leg 9p of the key locking plate, the leg 9p is pulled over the projection 9a of the depressed key by the action of spring 9o, whereby the key is held in depressed position. At the same time by the swinging of the yoke 9d the wheel 32 is moved out of mesh with its rack bar 3 and is held in this position as long as any key in its row is depressed. In front of the tongues 9n of all the key locking plates 9m is slidably mounted under the cover plate R a rake 9q which is provided with teeth 9r. The left end of the rake is provided with a tongue 9s which projects through an aperture s1 of the cover plate R. When the rake 9q is moved by means of the tongue 9s in the direction of the arrow in Fig. 1 against the action of a spring (not shown), the teeth 9r of the rake swing all the locking plates 9m in clockwise direction, thereby releasing all depressed keys which return to their normal positions through the action of spring 9h. The small wheels 32 are thereby brought into mesh again with their rack bars 3, while all wheels 2 are disengaged from their rack bars 3. If only a single row of keys is to be released, then the corresponding tongue 9n is pressed in the direction of the arrow in Fig. 1. If, then, any key is depressed, its wheel 2 will be brought into mesh with the corresponding rack bar 3. Thus, the movement of a rack bar 7 (Figure 1) will be communicated to the corresponding rack bar 3 by means of the small gear wheel 8, shaft 27 and gear wheel 2, if the corresponding key has been depressed.

As compared with the previous state of the art the novelty and characteristic feature of this part of the device resides therefore in the fact that the well-known driving mechanism which produces proportional movements in accordance with the values of the quantities from 1 to 9 is connected to a second group of rack bars 3 in such a manner that the coupling or connection of both systems or groups of rack bars may be effected at any suitable point by the operation of keys.

The rack bars 3 which are disposed in the interstices between the discs of the counting mechanism extend below the said counting discs or wheels, and they therefore are adapted for the direct rotation thereof. This arrangement presents the advantage, as compared with the known state of the art, that all the counting wheels or discs may be coaxially disposed upon one and the same shaft, and in consequence thereof a greatly simplified, compact and stable arrangement and construction of the entire counting mechanism has become possible.

Example of addition by means of this arrangement. 89+101. The quantity 89 is set in the "result-mechanism" $W_1$ or $W_2$ by depressing the 8-key and the 9-key in the second and first rows of keys from the right, so to cause the engagement of the corresponding small gear wheels with the corresponding rack bar 3, while all other small gear wheels 2 remain out of engagement. By rotating the handle 1 in the direction of the arrow K, the connected or coupled rack bars are moved for the distance of 8 and 9 digits respectively by means of the rack bars 7, the gear wheels 8, shafts 27 and gear wheels 2, and the counting mechanism is therefore correspondingly set.

After the first quantity to be added has been transferred to the result-mechanism in this manner, the keys of the values 8 and 9 are returned to the initial position in the described manner. After the setting of the second quantity "101" in the same manner as above described with reference to the other quantity, the crank handle is again operated. The units wheel of the counting mechanism is further rotated through one digit, that is to say from 9 to 0 with transmission of the tens to the tens-disc which will then indicate 9, and the hundreds-disc of the counting mechanism is moved from 0 to 1, and in the counting mechanism the final result of the sum is shown

```
   89
 +101
 ----
  190
```

The revolution counter U of well known construction, shown in Figures 1, 6 and 6a indicates the number of the several revolutions or operations of the crank handle upon each calculation. It is directly connected by gearings 12, 13, 14, 15, 16, 17 to the crank handle 1. The wheel 12 (Figs. 1, 6 and 6a) is rotatably, but non-shiftably mounted upon a pin 12a (Fig. 6a) and is adapted upon movement of the counting mechanism frame to enter into engagement in succession with the toothed wheels 12b secured to the number wheels, the toothed wheels for this purpose being made slightly larger than the number wheels. The member 13 has a single tooth which, through wheel 12, advances the wheel 12b and the number wheel secured thereto one value at each revolution of the crank handle 1. In accordance with the example of addition as above stated this counting mechanism U shows the number 2. Adjacent to the counting and result-mechanism $W_1$ another result-mechanism $W_2$ and a printing mechanism D are provided, so as to comply with the prevailing practical requirements. The result mechanisms are composed of numeral wheels 300 and 301 rotatably mounted upon shafts 19b and 18b. Shafts 18 and 19 (Figs. 1, and 1a), which extend along the result mechanisms $W_1$, $W_2$, are rotatably mounted in the carriage of the counting mechanism. Upon each end of these shafts, levers 18a and 19a are fastened which carry the shafts 18b and 19b of the number wheels of the result mechanisms $W_1$ and $W_2$. The levers 18a and 19a at the left end of the shafts 18 and 19 as seen in Fig. 1 are in the form of bell crank levers (Fig. 1a) 18a, 18c and 19a, 19c whose arms 18c and 19c stand in contact with cam discs 20, 21. The latter can be rotated by levers 20a and 21a (Fig. 1). When these levers are rotated so that the discs 20 and 21 are rotated clockwise in Fig. 1a, the raised parts of the discs 20 and 21 act on the arms 18c and 19c of the crank levers 18a, 18c and 19a, 19c and rock the same clockwise, so that the arms 18a and 19a of the crank levers lift the shafts 18b and 19b, whereby the result mechanisms W₁ and W₂ can be thrown out of engagement with the rack bars 3. In this manner values can be entered selectively in either of the two counting mechanisms or in both according to the position of the cam discs 20 and 21. Substantially at the middle of the shafts 18 and 19 are fastened short levers 18d, 19d. Transversely above each of these levers is mounted a rod 18e, 19e (Fig. 1c), each of which is linked to two bell crank levers 18f, 18g and 19f, 19g at the points 18h, 19h and 18i, 19i. The bell crank levers 18f, 19f and 18g, 19g are rotatably mounted at 18k, 19k and 18l, 19l upon stationary pins on the machine frame. Their downwardly projecting legs are connected together by rods 18m, 19m. These rods are slightly extended to the right and carry rollers 18n, 19n which are in contact with cam discs 18o, 19o. These cam discs are fixed upon a shaft M, which is rotatably mounted in the machine frame and is driven by the bevel gears N, O, P, 17. When the crank 1 is turned in the direction of the arrow K, the cam discs 18o, 19o are rotated in the direction of the arrow shown in Fig. 1c. As can be seen from Fig. 1c the number wheels W₁, W₂ remain during the first half revolution of the crank in engagement with their rack bars 3, while at the beginning of the second half revolution they are moved out of engagement with the rack bars 3, whereby the values are entered in the counting mechanisms W₁ and W₂ remain therein. The printing mechanism, in accordance with the exemplification of Figure 1a, comprises the writing or printing roller or platen 22, the type carriers 23 with horizontally displaceable number types of the figures from 0–9 and with the hammers 24 which are operated by the cam 26⁰ and which strike the number types against the printing roller 22. The printing mechanism further comprises the toothed segments 25 which are linked to the corresponding rack bars 3 by means of a pin and slot connection at 26 and which cause the type carriers to be raised and lowered in conformity with the number registered in the result-mechanism. The cam or the like 26⁰ operates the projections 28 of the hammers 24, so that these hammers in the first place are moved rearwards, while tensioning the springs 29; the hammers, as soon as they have been released from the cam 26⁰, being thrown forward by the action of the springs 29 and producing the printing of the particular figure upon the printing roller 22. When the device is set for subtraction, that is to say, when the left hand rack bar 7 is arrested, all the small wheels 32 (Figure 1) are rotated for the value of 9 units by means of the wheel 100 since inasmuch as the left hand rack bar 7 is held stationary by the bolt 10, the right hand rack bar 7 is now moved for 9 units. However, all wheels 8 are always turned in the same direction irrespective of whether addition or subtraction is performed, that is to say subtraction is performed by adding the complement of the subtrahend. For instance, if 25 has to be subtracted, this is performed by adding 99999974 because the wheel 8, which corresponds to the value "5" of the amount set (25) is moved by the sixth rack bar 7 from the right in Fig. 1 by four units, while the wheel 8 which corresponds to the value "2" of the amount set (25) is moved by the third rack bar 7 from the right in Fig. 1 for seven units. In this way the right hand rack bar 3 is moved for four units and the second rack bar 3 from the right is moved for seven units. But in subtracting "25" from zero, it is a matter of course that all decimal places to the left of the two right ones must show nines. This is accomplished by the wheel 100 which is turned by the right hand rack bar 7 for nine units and consequently turns all wheels 32 equally for nine units. It is obvious that the two right hand rack bars 3 which are already engaged with the corresponding wheels 2 of the five- and two-key must not be engaged by the wheels 32 as they move for nine units and the wheels 2 in the case set forth move for four and seven units respectively, that is to say the machine would be damaged. It is for this reason, that whenever in any row of keys a key has been depressed, the corresponding wheel 32 must be brought out of engagement with its rack bar 3, which is performed in the manner set forth in connection with Fig. 1b.

Now, as will be seen from the above, the result 99999974 in the result mechanism is wrong in as far as the units decimal place shows only a "4" instead of showing a "5". This is corrected in the following manner. The wheel 30 possesses only 9/10 of the number of teeth of the wheel 100, thus for instance 9 teeth, and it will therefore perform a full rotation which is transmitted to the result-mechanism by way of the wheel 31 and a short rack bar 31a (Fig. 1d) and which rotates the pinion 31b (Fig. 1) to the right of the units number wheel for a whole revolution, that is to say causes the addition of "10" to the pinion 31b and thence, by a tens-transmission device diagrammatically indicated at 31c, the advancing of the units number wheel for 1 value, so that this wheel which indicated hitherto "4", indicates now "5", which is the correct value.

The tens transfer device may be of any known kind such as for instance shown in U. S. Patent 1,391,319. The driving movement of the numeral wheel shaft, designated in said patent by the reference numeral 1 may be derived in the present case from the shaft M (Fig. 1).

Example of a subtraction by the machine:—

$$368$$
$$-159$$

The minuend 368 is first set in the result-mechanism W₁ or W₂, whereupon in the three right hand rows of keys the number 159 to be subtracted is now set. Thereupon the bar 10 is moved to the left, and the fulcrum of the lever 85 is thereby transferred to 11b. Thereupon the crank handle is operated. Although the depression of the 9 key has brought the toothed wheel 2 into mesh with its rack bar 3, nevertheless, there is no movement transmitted to the rack bar 3 when the crank is rotated, inasmuch as the left hand rack bar 7 is arrested by the bar 10. Consequently this rack bar is not able to rotate its wheel 8 and therefore the shaft 27 of this wheel, the corresponding pinion 2 and the right hand rack bar 3 remain stationary and the value "8" in the units place of the minuend standing in the result mechanism, will remain unchanged. In the tens-digit of the result-mechanism the Figure 6 has been set; in the corresponding row of keys the figure 5 has been depressed, and therefore, the corresponding coupled rack bar 3 (that is to say the second one from the right) will be displaced through four units and the tens-disc is changed from 6 to 0, while at the same time by means of tens-transmission the hundreds-disc is changed from 3 to 4. Through the above mentioned depression of the 1 key in the hundreds key row the toothed wheel 2 is brought into engagement with its rack bar 3 and will therefore move this rack bar for eight values when the crank *l* is rotated. The counting disc for the hundreds which is still indicating the figure 4 is therefore further rotated for 8 figures, so as to arrive at 2. During this time the tens-transmission has been again operated, so that the next digit to the left will be caused to jump from 0 to 1. The rack bar 3 corresponding to this digit, inasmuch as no key in this row has been depressed, is displaced through 9 units by means of the wheel 100 and the lowermost shaft 27 and the corresponding small wheel 32, and in consequence thereof the counting disc of the fourth digit is likewise caused to turn from 1 over 2, 3, 4 etc. to 0. At the same time the fifth digit is set to 1 by the tens-transmission, while the wheels 100 and 32 cause the corresponding rack bar, the same as has been done with the fourth digit, and the fifth digit to be turned from 1 over 2, 3, 4 etc. to 0. This tens-transmission is then continued to the last digit of the counting mechanism, so that in accordance with the procedure thus far described the number 0000000000000208 would appear in the result-mechanism. The calculation is however not yet finished by this operation, because there is a second small wheel 30 with only 9 teeth meshing with the right-hand rack bar 7. Inasmuch as the right-hand rack bar 7 is displaced by the proportional lever 85 through nine units, the wheel 30 will make a full rotation which will be transmitted by means of the wheel 31, rack bar 31a and pinion 31b adjacent the units number wheel to the result mechanism by means of the tens-transmission and causes the units number wheel to advance for one unit, and by this means the correct final result is obtained, viz. 0000000000000209. The different procedures herein described in succession will, of course, in the practical operation of the machine take place almost simultaneously.

The operation for performing divisions and multiplication is similar to the ones described; and reference may be made in this connection to U. S. Patent 1,011,617 in which the proportional lever has also been disclosed.

In Figure 2 of the drawings the same machine is shown as in Figure 1, with the simplification, however, that the inconvenient switching from addition to subtraction is avoided, the crank being rotated in one direction for addition, and in the opposite direction for subtraction. The relative position of the pivoting point of the proportional lever 85 may now remain unchanged. For the purpose of subtraction the proportional lever 85 by means of its stud 33 is connected to the short pulling lever 34, while for addition the proportional lever is connected to the long lever 35 (see Figures 2a, 2b, 2c). The proportional lever is pulled in the first case, while it is pushed in the second case. The means which may be employed for effecting the automatic reversing in connection with the rotation of the crank handle to the right or to the left respectively are shown particularly in Figures 2a–2c. The levers 34 and 35 are connected to pins 36 and 37 which are riveted to a disc 38 at diametrically opposite points. The pin 37 is in the form of a spacing bolt and to its end remote from the disc 38 a similar disc 39 is secured in such a manner that it lies concentrically over the disc 38. The crank is secured to the disc 39. On both sides of the disc 38 two spring-pressed pins 40, 41 are mounted in suitable positions. The short lever 34 is provided at its upper extremity with a laterally directed extension 42 upon which the lever 35 is adapted to rest, and which always maintains a certain distance between the levers 34 and 35. Another extension 43 of the lever 34 is bent over the lever 35 and forces the same always gently against the lever 34 and its extension 42 by means of a spring 44. Upon rotating the handle clockwise the spring pressed pin 40 bears against the lever 34 (Figure 2a), and causes the notch 45 of the lever 34 to be gradually made to engage the stud 33, while the lever 35 is downwardly displaced along the extension 42 with relation to the lever 34. This lever 34 is, of course, raised simultaneously and carries the stud 33, that is to say the proportional lever 85 with it. Upon continuing the movement of the crank the spring-acting pin 40 is forced underneath the lever 34 and is at last made to project again from below the lever 34, which operation is however without influence upon the connection of the parts 34, 33. The frictional pressure of the stud 33 in the notch 45 is sufficient to maintain the connection between the members 33 and 34 during the rather quickly proceeding movement of the crank. Upon rotating the crank or handle in the opposite direction (rotation to the left) the second spring acting pin 41 acts upon the extension 47 of the other lever 35, which extension extends axially beyond the pivoting point 37, and the said lever 35 is thereby propelled in the direction towards the stud 33, until the notch 46 engages over the stud 33; hence the stud 33 and the proportional lever 85 are moved in the opposite direction. In order to facilitate the movement of the spring-acting pin 41 below the lever 35 and from below the same as long as the crank is rotated to the right, or, as long as the spring-acting pin 40 is acting upon the lever 34, the lever 35 may be somewhat recessed at 48 (Figs. 2b and 2c), and is somewhat bevelled at 49 near the lower edge acted upon by the pin 41. The said bevelling should however only be effected upon the right-hand edge of the lever 35, as shown in the drawings (Fig. 2d), while the left-hand edge should be left unchanged, so that the pin 41 upon the left-hand rotation of the crank may be sure to become engaged and to rock the lever 35. Also the lever 34 may be provided with a flaring portion at its right-hand edge, as shown at 50 in the drawings (Figs. 2b and 2e), by means of which the passing of the spring-acting pin 40 past the lever is facilitated, as long as the crank is rotated to the left and the pin 41 acts upon the lever 35.

Figures 3 to 4c illustrate another modified construction of the invention. Between two horizontally disposed walls 50a and 51 of the casing the plates 52₁ to 52₉ are mounted in place of the usual bars 7, the said plates being connected to a proportional lever 85 in the same manner as said bars 7. For the purpose of operating the lever 85 any suitable means heretofore known, thus, for instance, the means last described with reference to Figures 2a–2c, may be employed. The plates 52₁ to 52₉ are slidably mounted in the vertical side walls of the casing by means of lugs 52a (Figs. 4 to 4c, only the lugs on one side of the plate are shown) sliding in corresponding grooves 52b (Fig. 4) in the vertical side walls. At the front edge of each plate 52₁ to 52₉ pawls or the like 53₁ to 53₉ are arranged the number of which corresponds to the rows of keys from 1–9. The pawls are pivotally mounted by means of pins $53a$ and are acted upon by springs 54 (see Figure 4) and are adapted to couple the plates $52_1$ to $52_9$ to one of the rack bars 3 which, as has been described with reference to Figure 1, are adapted to set the result mechanism and also a printing mechanism. Inasmuch as each of the plates $52_1$ to $52_9$ requires provision for connecting the same to every existing bar 3 of the counting mechanism, each bar 3 should be provided with an angularly disposed member $3a$ (Figure 3). The printing mechanism in this form of construction is at a lower level with relation to the result mechanism than in the form of construction according to Figure 1. The eye of the operator is therefore no longer compelled to cover such a distance as heretofore. In the preferred construction the machine may be raised at its rear portion by placing a foot F below the same, so that the counting mechanism, printing mechanism and the key board may be still more easily inspected. In this form of construction the keys must be adapted for being depressed. Upon the depression of a key one end $55_1$ to $55_9$ of the pawl $53_1$ to $53_9$ drops, under the influence of its spring 54, into a notch 56 (Figure $4b$) of its corresponding key stem 57, while the other end of the pawl, which may, for instance, be hook shaped is moved into engagement with the angularly disposed members $3a$ of the rack bars 3. In Figs. $4b$ and $4c$, the amount "139" is set up, that is to say, in the units row of keys the 9-key is depressed, in the tens row, the 3-key is depressed and in the hundreds row, the 1-key is depressed. Consequently, as seen from Figs. $4b$ and $4c$ the right-hand pawl $53_9$ of the plate $52_9$ is engaged with part $3a$ of the right-hand rack bar 3. As to the plate $52_3$, only the second pawl $53_3$ from the right of that plate is engaged with part $3a$ of the second rack bar 3 from the right. As to the plate $52_1$ only the third pawl $53_1$ from the right of that plate is engaged with part $3a$ of the third rack bar 3 from the right. If now the proportional lever 85 is oscillated, the plate $52_9$ moves the right-hand rack bar 3 by means of the coupled hook $53_9$ through nine units. The third plate $52_3$ moves the second rack bar 3 from the right through three units and the plate $52_1$ moves the third rack bar 3 from the right through one unit. Although all plates $52_1$ to $52_9$ are moved, only those plates and hooks of those plates are operative on the rack bars 3, which have been coupled with them by the depression of the corresponding keys. Locking means for the keys may, of course, be employed as usually which upon the operation of a key produce the raising of the previously depressed key of the same row of keys. In order to be able to more easily disengage the ends $55_1$ to $55_9$ of the pawls from the notches 56 upon the raising of the keys, the corresponding edges of the notches 56 and the ends $55_1$ to $55_9$ of the pawls are bevelled (see Fig. $4a$). In order to provide for the possibility of displacement of the plates $52_1$ to $52_9$ by the lever 85, while permitting the keys of the plates $52_1$ to $52_9$ underneath the same to pass through the plates, as many slots 58 are provided in the plates as will correspond to the number of vertical rows of keys from 1–9. The length of the slots 58 is so arranged that at least nine key stems 57 may be housed therein. The length of the slots should moreover be such as to afford sufficient room for the proportional movement on both sides. The slots 58 of the plates $52_1$ to $52_9$ may be gradually shortened in the lower plates, and also the lower plates themselves may be gradually shortened, so that the length of the slot in the lowermost plate $52_1$ corresponds to the movement of one unit only (Fig. $4c$). In proportion with the shortening of the plates $52_9$ to $52_1$ however, the length of the pawls $53_9$ to $53_1$ has to be increased, inasmuch as the keys thereby become more and more removed from the rack bars 3. The farthest away from the rack bars 3 are, for instance, the 1-keys, and the pawls corresponding thereto should therefore have the greatest length.

In Figure 5 is shown a somewhat different form of construction of the setting mechanism according to Figures 3 and 4. For each key row of the machine is provided a special proportional lever $85^x$. This lever constitutes a segment of a circle with the point 101 as a center. All the proportional levers $85^x$ are rotatably mounted upon a shaft 102 fixedly secured in the machine, and by means of any one of the known crank drives similar movements of the same length are imparted to them. For the purpose of being operated in common all proportional levers are rigidly connected with each other by a bar 103, there being as many proportional levers, as rows of keys from 1–9. In each rack bar 3 a pin 101 is rotatably mounted and upon this pin at the right and left sides of the rack bar 3 are fastened respectively bars 106, $106a$ and $106b$, $106c$ (Figs. $5a$ and $5b$). At the other end these bars are connected together by a bolt 105 which is adapted to slide in slot 104. The parts 106 to $106c$ and 105 therefore form a frame adapted to swing about the point 101. Each frame is normally held by a spring $fo$ in the position shown in Fig. 5 in full lines. The pin $106d$ of the 9 key bridges over bar $106b$, but works only upon the bar $106c$, the pin $106e$ of the 8 key bridges over bar $106a$, but works only upon the bar 106, the pin $106f$ of the 7 key works upon the bar $106a$ the pin $106g$ of the 6 key works upon the bar $106b$, etc. As can be seen from Figs. 5 and $5b$ the bars 106 to $106c$ are curved at their upper edges. The purpose of this formation will appear from the following description. If, for example, the 9 key is depressed, its pin $106d$ works upon the bar $106c$, whereby the swinging frame 106 to $106c$, 105 is moved against the action of spring $fo$ into the position shown in dotted lines in Fig. 5, in which it is held by a detent for the depressed key (not shown). The surface of the bar $106c$ with which the pin $106d$ cooperates is then parallel to the rack bar 3, so that when the proportional lever $85^x$ is swung by means of the crank, the frame 106 to $106c$, 105 will execute no further swinging motion, but will be guided straight in its adjusted position by the key pin $106d$. In the same manner the other curves of the bars 106 to $106c$ must be so formed that the frame 106 to $106c$, 105 will be guided straight by the particular key depressed. The distribution of the keys between four bars 106 to $106c$ is made necessary by the distance between the keys. It should be noted that all the keys are adapted to descend through the same distances, and that therefore the movement of the frame 106 to $106c$, 105 is decreased in inverse proportion to the distance of the key depressed from the pivoting point 101. This pivoting stud 101 serves at the same time for the connection of the several frames 106 to $106c$, 105 with the well known rack bars 3 of the counting mechanism, and by these rack bars 3 the counting mechanism $W_1$ and $W_2$ respectively and the printing mechanism D are operated.

The mode of operation of this modification of the device is substantially as follows:—Upon the depression of any of the keys 107 the stud 105 is displaced to a corresponding extent within the guide slot 104. With the subsequent turn of the crank all proportional levers $85^x$ are rocked on their shaft 102 to the same extent. These proportional levers thereby move the rack bars 3 by means of the frames 106 to 106c, 105 through greater or smaller distances depending, of course, upon the selection of the keys. From what has been said before it will be seen that in those rows in which no key has been depressed the frames 106 to 106c, 105 will remain in their positions of rest when the proportional levers $85^x$ are swung, for the slight swinging of the point 105 around the point 102, so to speak, will cause no displacement of the frames 106 to 106c, 105 which have not been depressed.

The calculation with the machine in regard to multiplications may be still more simplified by making provision for setting the multiplier in the driving mechanism. A form of construction of the machine, showing this modification is illustrated in Figures 6 and 7 of the drawings.

Above the system of the usual proportionally moved rack bars which is well known (these rack bars having been designated 7 in Figure 1), and which in this modification of Fig. 6 comprises the rack bars $7_1, 7_2, 7_3, 7_4$ and so on, nine four-cornered shafts $27_1, 27_2, 27_3 \ldots 27_9$ are disposed at right angles to the rack bars and extend over the entire key-board. The rack bars $7_1$—$7_9$ may be reciprocated by the proportional lever 85 and the drive mechanism illustrated in Figs. 2 to 2c. Upon the left hand portion of each four cornered shaft, similar to the construction of Figure 1, are a number of laterally displaceable gear wheels corresponding to the number of rows of keys. All these gear wheels, as already stated, are laterally displaced upon the depression of the corresponding key, so that the rotary movement imparted to them by the four-cornered shafts $27_1, 27_2 \ldots$ or $27_9$ is transmitted to the bars $3_1, 3_2, 3_3 \ldots 3_9$ of the counting mechanism, the said bars being thereby longitudinally moved, and by this movement the discs of the counting mechanism are set in the proper position for the respective values.

Upon the right-hand extremities of the four-cornered shafts $27_1, 27_2 \ldots 27_9$ the setting wheels $8_1, 8_2 \ldots 8_9$ are axially displaceable. These wheels carry a tubular hub extension 65 (Fig. 10) in the interior of which spiral springs 66 are lodged which in the normal position are intended to retain the setting wheels above the bar $7_0$. In order to restrict the actual length of the hubs 65 required for the housing of the springs 66, the four-cornered shaft 27 may be preferably longitudinally bored, so that a portion of the springs may be lodged in said shaft. The setting of the wheels $8_1, 8_2 \ldots 8_9$ for a certain value is effected by displacing them in opposition to the pressure of their spring 66 by means of a setting body, the so-called "multiplication-table"-body. This setting body E comprises a plate 67 (Figs. 6, 7 and 8) upon which a number of studs of different length are disposed. This "multiplication-table"-setting body is particularly shown in Figure 8 of the drawings. The numbers shown therein constitute the products of the Figures from 1–9. The lowermost row of studs constitutes the products of the number 1, that is to say, the values $1 \times 1$, $2 \times 1$, $3 \times 1$ and so on up to $9 \times 1$. The second row of studs represents the products of the number 2, that is to say, $1 \times 2$; $2 \times 2 = 4$; $3 \times 2 = 6$; $4 \times 2 = 8$; $5 \times 2 = 10$; $6 \times 2 = 12$ and so on. In the same manner the other rows represent the products of the values of numbers 3, 4, 5 ... up to 9. For the sake of simplicity these studs in Figure 8 are not indicated as studs or pins, but only as circles with the value inscribed. The products which are composed of a units digit and a tens-digit, such as for instance $3 \times 4 = 12$ are represented by two pins on the multiplication-table-setting body, one being referred to as a units pin and the other as a tens-pin. Both pins are directly adjacent each other. In the special case under consideration $3 \times 4 = 12$ the units pin of two longitudinal units would be located adjacent a tens-pin of one longitudinal unit. In Fig. 8 the pins $8x$ and $8y$ represent the product $6 \times 2 = 12$. If the product of a single number in the units position should show a zero, thus for instance, $4 \times 5 = 20$, the tens-pin would have to be two units long and the units pin would have to be dispensed with, because its length amounts to zero units. In Fig. 8 the pins $8z$ and $8u$ represent the product $5 \times 4 = 20$.

This "multiplication-table" body is movably mounted, so as to allow of movement in three directions in the following manner. Upon a crank shaft 68 (Figs. 6 and 6e) is fastened a disc 68a which is provided with teeth for substantially half its circumference. Under the disc 68a a cam disc 68b is secured to the shaft 68, the disc 68a and cam disc 68b being arranged with respect to one another in the manner shown in Fig. 6. Between the disc 68a and the cam disc 68b (Fig. 6e) there is fastened on the shaft 68 a bevel gear 68c which is in mesh with a large bevel gear 68d secured to a shaft 68e. The ratio of transmission between these two bevel gears is 2:1. That is to say, when the bevel gear 68c is rotated twice, the bevel gear 68d and the parts connected therewith execute only a single rotation. On the other end of the shaft 68e are fastened a cam disc 68f and a finger $68f_1$. The cam disc 68f is adapted to work through the instrumentality of an intermediate member 68g upon a flange 68h on the main carriage of the multiplication body E (Figs. 6, 6b, 6c). The intermediate member 68g is connected to a lever 68i which is adapted to draw the intermediate member 68g out from between cam 68f and flange 68h when moved in direction of the arrow in Fig. 6, thereby moving the intermediate member 68g and the multiplication body E in the direction of the arrow Z through the action of a pin $68i_1$ on the diagonal surface $68i_2$. In this case all motion of the cam disc 68f is without effect upon the flange 68h.

During the rotation of shaft 68e in the direction of the arrow shown in Fig. 6d, the finger $68f_1$ operates upon a lever $68f_3$ pivoted at a point $68f_2$ which is connected at $68f_4$ to a rod $68f_5$ leading to an escapement device controlling the carriage of the counting mechanism which is under the influence of a spring tending to pull it in the direction of the arrow A (Fig. 6). Since escapement devices are used in all calculating and typewriting machines and therefore well known, a description of the construction here will be unnecessary. Such an escapement device is shown for instance in U. S. Patent 1,011,721, wherein the rod 37 corresponds to rod $68f_5$ of this application. It will be sufficient to say that whenever the finger $68f_1$ strikes the lever $68f_3$, the carriage of the counting mechanism advances one decimal point in the direction of the arrow A (Fig. 6). The main carriage of the multiplication body consists of a base plate $a$ guided by two tracks $b$ and $c$. This plate $a$ is normally held against stops 68$l$ and 68$m$ by two springs 68$j$, 68$k$. On the plate $a$ are fastened two guide tracks $d$, $e$ (Fig. 6$b$), in which are guided vertical supports $g$, $h$ for the multiplication body E. These supports are connected together by a plate $f$. To the supports $g$ and $h$ are fastened T-shaped guide tracks $i$, $j$ (Figs. 6 and 6$b$) upon which the plate 67 is mounted for vertical sliding by means of grooves (Figs. 6 and 6$c$). To the plate 67 is linked at $k$ a lever $l$ which is pivotally connected at $m$ to a lever $n$, which in turn is pivoted at $o$ to the plate $f$. These two levers form an elbow linkage adapted when bent to pull down the multiplication body E which is normally held in the position shown in Fig. 6$b$ by springs $z$. For this purpose a flange $n_1$ is formed on lever $n$, upon which the arm $p_1$ of a lever $p$ pivoted upon a pin $p_2$ is adapted to work. The pin $p_2$ is fixed to the key frame $q$ mounted upon the supports $g$ and $h$. In the key frame $q$ are arranged the multiplier keys $r$, whose studs $r_1$ are adapted to engage the lever $p$ and swing it down. The lever $p$ is so shaped that for equal downward movements of the keys $r$ it swings down to various extents; that is to say, it swings down further the nearer the depressed key is to its pivot $p_2$. For example if the key $r$ corresponding to the value 5 is depressed, the lever $p$ is swung downward and its arm $p_1$ bends the elbow levers $l$, $n$, which pull down the multiplication body to such an extent that the row of pins designated $S_5$ (Fig. 8) stands opposite the hubs 65 of the wheels 8$_1$ to 8$_9$. In this position the multiplication body E is retained by the key $r$ which has been depressed. For this purpose the keys $r$ are provided with bevelled lugs $r_2$ which, upon depression of a key, move a key locking bar $t$ against the action of a spring $r^3$ (Fig. 6$g$), whereupon the key locking bar moves back over the lug $r_2$ under the action of its spring and thereby holds the depressed key, the lever $p$, and the multiplication body E in the adjusted position. On the key locking bar $t$ is provided a knob $t_1$. By pulling the knob the depressed key can be released. On the other hand, the depressed key can also be released by depressing another key. When a key is released by pulling on the knob, the multiplication body E returns to its uppermost position, whereas when a depressed key is released by depressing another key, the multiplication body is immediately moved to its new position of adjustment corresponding to the subsequently depressed key.

To the plate $f$ is linked at the point $u$ a lever $v$, which is connected to a bell crank lever $w$ pivoted at a point $v_2$. On the arm $w_1$ of the bell crank lever is arranged a roller $x_1$, which is held by a spring $y_1$ in contact with the previously mentioned cam disc 68$b$, whereby the multiplication body E of all the multiplier keys is normally held in the position shown in Fig. 6. There may also be arranged to engage an abutment at the point $u$ a hand lever $z_2$ pivoted at $z_1$, which when moved in the direction of the arrow in Fig. 6, forces the multiplication body against the hubs 65 of the adjusting wheels 8$_1$ to 8$_9$.

As can be further seen from Figs. 6 and 6$e$ there is fastened to the shaft 69$a$ upon which the bevel wheel 17 is mounted a toothed wheel 69$b$ which meshes with an intermediate wheel 69$c$, which latter is so broad that it may also mesh with the toothed part of disc 68$a$.

The manner of operation of this device will be explained later on in connection with an example of computation. The modified form of construction according to Fig. 9 avoids the lateral displacement of the multiplication-table-body E in the direction of the arrow X by providing the setting wheels 8$_1$, 8$_2$ ... 8$_9$, instead of with the hub 65 with interior springs, with hubs 69 which have the shape of round rack bars. These round rack bars 69 together with the wheels 8 connected to them are normally held in the position shown in dotted lines in Fig. 9. As can be seen from Fig. 9 it is advantageous in this form of the invention to move the rack bar 7$_0$, which is shown in Fig. 6 at the right beside rack bar 7$_1$, to a position beside the rack bar 7$_9$. The rack bar 7$_0$ is not moved in either of the embodiments shown in Fig. 6 and Fig. 9; it needs not be connected with the proportional lever, and therefore remains at rest and serves simply to secure the wheels 8 against undesired rotation. The round rack bars 69 are engaged by wheels 70 and can be moved by the latter in the direction of the arrow in Fig. 9 against the pins of the multiplication body E, whereby the wheels 8 are adjusted over the proper rack bars. The wheels 70 are mounted upon a common shaft 71. In view of the fact that the degree of rotating movement of the shaft 71, which may be produced either manually or by motor action, is always of the same dimension, while the lengths of the setting pins are different, the driving wheels 70 have to be loosely mounted upon the shaft 71, and they may be carried along by the shaft by means of torsional springs 72. These springs are fastened at their inner ends 72$a$ (Figs. 9$a$ and 9$b$) to the shaft 71 and at their outer ends 72$b$ to the inner wall of the cylindrical opening of the wheels 70. When the setting wheels 8 assume their normal position shown in dotted lines in Fig. 9, the springs 72 are untensioned. As soon as one of the round rack bars 69 of the setting wheels 8 impinges against a setting pin S (Fig. 9) of the multiplication-table body while turning the shaft 71 clockwise in Fig. 9, the corresponding spring 72 of this rack bar is of course tensioned, while the shaft 71 must still be turned clockwise for the purpose of setting such wheels 8, the rack bars 69 of which have not yet reached the studs of the multiplication-table body. The wheels 70 are therefore adapted to lag behind any further rotation of the shaft 71, after they have carried the corresponding hub 69 into contact with the setting pin.

In Figure 9 a position is shown according to which a setting wheel 8 has just been positioned above the central rack bar 7$_6$ by the rotation of the shaft 71. Since rack bar 69 impinges against its setting pin S the spring 72 is tensioned by further turning of the shaft 71. If now during this further turning movement of shaft 71 another rack bar 69 impinges against its setting pin, for instance against the pin of the value "3", then the corresponding wheel 70 remains also stationary and on further turning the shaft 71, the corresponding spring 72 is tensioned. It is a matter of course that the extent of resiliency of the springs 72 between the shaft 71 and the wheels 70 must be so dimensioned that if for instance a rack bar 69 impinges against a setting pin of the value 9, the shaft 71 must still be allowed to be turned through a distance which equals the difference of length of a setting pin of the value 9 and a setting pin of the value 0.

Assuming for instance that it is desired to multiply the number 3854 by the number 567. The procedure is as follows:—The operator depresses the 3-key in the fourth row from the right, then the 8-key in the third row, 5 in the second row and 4 in the first row of the left hand field R of the key board. The corresponding coupling wheels 2 on the four-cornered shafts $27_3$, $27_8$, $27_5$, $27_4$ are thereby laterally displaced and become now engaged with the rack bars $3_4$ $3_3$ $3_2$ $3_1$ of the counting mechanism. The engaged wheels 2 are shown in heavy black lines in Fig. 6h. The counting-mechanism carriage which is for instance provided with the counting mechanism $W_1$, $W_2$ (Figure 1) must be drawn towards the right for three decimal places since the multiplier "567" is of three decimals. Now the multiplication key 5 of the multiplication-table body is depressed (it being desired to multiply by 567). By depression of the 5 key its shaft $r_1$ (Fig. 6b) works upon the lever p and swings it about the point $p_2$ in clockwise direction. At the same time the arm $p_1$ of the lever p pushes against the flange $n_1$ of lever n, whereby the above described bending of the elbow linkage n, l is accomplished and the multiplication body E moved down to the position in which the horizontal pin row $S_5$ (Fig. 8) stands opposite the hubs 65 (Fig. 6), the tens pins of this row being opposite the hubs 65 at first (Fig. 6h). As above described the multiplication body remains in the adjusted position by the locking of the key depressed. Hereupon the crank shown in Fig. 6 is rotated clockwise, whereby the cam 68b operates upon the roller $x_1$ and turns the bell crank lever w counter clockwise about the point $v_2$, whereby the multiplication body is drawn by the rod v against the hubs 65. During this movement there can be no motion of the proportional lever 85 because the disc 68a causes no rotation of the wheel 69c and therewith of the proportional lever 85, owing to the lack of teeth on half its periphery. When the roller $x_1$ has reached the highest point of the cam disc 68b, all hubs 65 and their wheels 8 are adjusted according to the pins lying opposite them. More particularly the wheels $8_3$, $8_8$, $8_5$, $8_4$ (the multiplicand was 3854) upon the four cornered shafts $27_3$, $27_8$, $27_5$, $27_4$ have been adjusted as follows:

The wheel $8_3$ has been positioned in accordance with the tens pin Sa (Figs. 8 and 6h) corresponding to the product 15 over the rack bar $7_1$, the wheel $8_8$ by the tens pin Sb (Figs. 8 and 6h) corresponding to the product 40 over the rack bar $7_4$, the wheel $8_5$ by the tens pin Sc (Figs. 8 and 6h) corresponding to the product 25 over the rack bar $7_2$, and the wheel $8_4$ through the tens pin Sz (Figs. 8 and 6h) corresponding to the product 20 over the rack bar $7_2$. The other wheels 8 have been adjusted also by their opposite tens pins of the pin row S5, but since none of their wheels 2 on shafts 27 stand in engagement with the rack bars 3, there will be no motion imparted to the rack bars 3. As can be seen from Fig. 6 the multiplication body, and therewith also the wheels 8, are held in their adjusted positions upon further rotation of the crank by the concentric periphery of the cam disc 68b. Upon further rotation of the crank the teeth of the disc 68a come into engagement with the intermediate wheel 69c, rotating the toothed wheel 69b clockwise. Since the disc 68a is provided with the same number of teeth as the toothed wheel 69b, the latter makes a complete revolution, whereby the proportional lever is moved through the instrumentality of lever 35 in the manner previously explained. In this way the rack bars 3 coupled to the wheels 2 bring into the counting mechanism $W_1$ and $W_2$ the value 1422 (compare Fig. 8, pin row $S_5$). After the last tooth of the toothed sector 68a has become disengaged from the intermediate wheel 69c, the roller $x_1$ is pulled down from the concentric periphery of disc 68b by the action of spring $y_1$, whereby the multiplication body E and the wheels 8 are moved back by the springs 66 into the positions shown in Fig. 6. There has been completed one revolution of the crank, during which through the instrumentality of the bevel gear 68c also the bevel wheel 68d and the cam disc 68f and finger $68f_1$ have been rotated, the latter, however, for only half a revolution. As can be seen from Fig. 6d, during this half revolution the lower concentric part of cam 68f was in contact with the intermediate member 68g, so that no motion was imparted by the cam 68f. During the last interval of the rotation of the crank, however, the higher part of the cam 68f has come into operation upon the intermediate member 68g, whereby the multiplication body E has been displaced against the action of springs 68j, 68k (Fig. 6) to such an extent that the units pins of the multiplication body E stand opposite the hubs 65. Furthermore at the same time through the action of the finger $68f_1$ the carriage of the counting mechanism has been moved one decimal place in the direction of the arrow A. The multiplication body E still stands with its row of pins $S_5$ opposite the hubs 65. Now if the crank is rotated the multiplication body E is again forced against the hubs 65 in the above described manner, but now, because of the preceding displacement of the multiplication body E in the direction of the arrow Z the units pins operate upon the hubs 65. Since the higher part of the cam 68f is concentric, during the further rotation of the crank the multiplication body E is held in the same position of adjustment.

After the multiplication body E has been moved by the cam 68b into its extreme left position (Fig. 6) in the manner above described the wheels $8_3$, $8_8$, $8_5$, $8_4$ (the multiplicand was 3854) on the four cornered shafts $27_3$, $27_8$, $27_5$, $27_4$ will have been moved into the following positions of adjustment:

The wheel $8_3$ will have been adjusted by the units pin Se (Figs. 8 and 6i) corresponding to the product 15 over the rack bar $7_5$, the wheel $8_8$ will have been left over the rack bar $7_0$ as a result of the zero pin Sf (Figs. 8 and 6i) corresponding to the product 40, the wheel $8_5$ will have been adjusted by the units pin Sq (Figs. 8 and 6i) corresponding to the product 25 over the rack bar $7_5$, and the wheel $8_4$ will have been left over the rack bar $7_0$ because of the zero pin Su (Figs. 8 and 6i) corresponding to the product 20.

Upon further rotation of the crank the teeth of the disc 68a again come into engagement with the intermediate wheel 6bc, whereby in the manner above described, the proportional lever 85 is rocked and thereby the value 5050 is brought into the counting device and since the value 1422 was already in the counting device and the latter has been moved to the left one decimal place, the following value will be indicated by the counting device:

1422
5050
———
19270

After the last tooth of the toothed sector 68a has become disengaged from the wheel 69c, the multiplication body E goes back into the position shown in Fig. 6. Upon completion of the rotation of the crank the cam 68f has also completed its rotation so that the intermediate piece 68g again stands in contact with the lower portion of the cam 68f and the springs 68j and 68k have been permitted to draw the multiplication body E in the direction opposite to the arrow Z back into its normal position.

Now the multiplier key r corresponding to the value 6 (the multiplier was 567) is depressed, whereby the depressed 5 key is released and the multiplication body stands with the row of keys marked $S_6$ opposite the hubs 65. Since upon rotation of the crank the procedure already described is simply repeated, it will not be necessary to go into it in detail again. Therefore after one rotation of the crank there will be added to the value already in the counting device $$\frac{19270}{\text{the value } 1432 \text{ so that}}$$

20702 appears in the counting device.

Thereupon the carriage of the counting mechanism is again released by the finger 68f₁ and moved again one decimal place to the left and upon further rotation of the crank there is added to the value in the counting mechanism $$\frac{20702}{\text{the value } 8804 \text{ so that}}$$

215824 appears in the counting mechanism.

Now the multiplier key corresponding to the value 7 (the multiplier was 567) is depressed. After one rotation of the crank there is added to the value in the counting mechanism $$\frac{215824}{\text{the value } 2532 \text{ so that}}$$

218356 now appears in the counting mechanism.

Thereupon the carriage of the counting mechanism is again released by the finger 68f₁ and moved one decimal point to the left and after the crank has been rotated again there has been added to the value $$\frac{218356}{\text{the value } 1658 \text{ whereby the final product}}$$

2185218=3854×567 is obtained.

The setting of the values of the multiplication-table body is effected in two operations which are derived from the rotation of the crank. The releasing and feeding of the carriage of the counting mechanism is also effected automatically, so that, in order to perform the multiplication 3854×567 it is only necessary to depress the keys 3—8—5—4 in the key board, and to operate the multiplier keys 5—6—7 with two succeeding rotations of the crank. While, therefore, with this arrangement only six complete rotations of the crank are necessary for carrying out the multiplication, in the previous machine it was necessary to perform 5+6+7=18 rotations, that is to say, 5 rotations for 5 hundreds, then shifting and 6 rotations for the tens, then again shifting with 7 rotations for the units. Multiplications may be carried out by the principles of this invention and with the provision of a "multiplication-table" body at a much more rapid rate than heretofore. In order to perform additions, subtractions and divisions (the latter operation in the manner substantially described in U. S. Patent 1,011,617 above referred to) the multiplication-table body may be set by depressing the key r of the value 1, so that its lowermost row of studs or pins $s_1$, is opposite the hubs 65. At the same time it is necessary to turn the lever 68i in the direction of the arrow in Fig. 6, whereby because of the pin 68i₁, and the diagonal surface 68i₂ of the intermediate member 68g the multiplication body E will be moved against the action of the springs 68j and 68k in the direction of the arrow Z, so that the units pins stand opposite the hubs 65. The lever 68i can be arrested in this position of adjustment by a spring pin (not shown). By swinging the lever $z_2$ in the direction of the arrow in Fig. 6 the multiplication body E is moved against the hubs 65, whereby the wheels $8_1$ to $8_9$ are adjusted into the positions shown in Fig. 1. The multiplication body E can be arrested in this position by locking the lever $z_2$ by means of a spring pin (not shown). Now all the different operations, addition, subtraction, division and also multiplication (though only in the manner of accumulative addition) may be carried out as usual. Fig. 6 shows that the coupling device shown in Figs. 2a, 2b and 2c can be used in connection with the arrangement shown in Fig. 1 to form a particularly desirable construction. In the modification of the invention shown in Figures 3 and 5 it may perhaps be considered as inconvenient that the members 53, 55 and 106 which are acted upon by the ke operation of the keys, move longitudinally during the calculation. This is avoided in the modification according to Figures 11 and 12. In this modification every row of keys corresponding to the values 1 to 9 is provided with a proportional lever 85y which is horizontally mounted underneath the keys and which possesses ten different holes 200 spaced so as to correspond to the values 1 to 9. Opposite each of the holes studs are disposed which are connected to the keys in such a manner that upon the depression of the keys the studs enter into the holes opposite the same and are thereby adapted to act as pivots for the proportional lever 85y. The manner of displacing the axial pins or studs is shown in Figure 12 on an enlarged scale. Adjacent every proportional lever 85y a bar 201 is stationarily disposed, which is provided with the same number of holes as the proportional lever and of the same diameter. On the other side thereof a U-shaped bar is likewise stationarily arranged which is likewise provided with holes corresponding to those of the proportional lever, so that in the position of rest of the proportional lever all the holes of the parts 85y and 202 will register. In the holes of the bar 202 the axial studs 203 are displaceably mounted, but secured against rotation. The said studs 203 are provided with pins 204 which are engageable with an inclined slot 205 of the stem of the key which stem is guided in the cover plate and in the bottom plate of the machine, and passes with play through the bar 202. A spring 206 normally retains the key in its highest position. If now any one of the keys is depressed in the direction of the arrow indicated in Figure 12, the corresponding axial stud 203 is displaced towards the left and enters the confronting hole of the proportional lever 85y and of the bar 201. Now inasmuch as the bars 201 and 202 are stationarily arranged, the proportional lever becomes adapted to turn on the axial stud. The ends of the proportional levers opposite the counting mechanism are all linked in the well known manner to a common crank drive, while the other ends of the levers are each connected to elbow levers 208 pivoted at 207, and one leg of which confronting the proportional lever is fork shaped, while the other leg of each lever 208 is linked to the pitman rods 209 for operating the rack bars 3. The crank drive imparts always the same degree of oscillation to the end of the proportional lever toward the counting mechanism, and the opposite end of said lever will therefore produce an oscillation which will correspond to the particular value of the depressed keys, the said oscillation being communicated to the rack bars 3 by the elbow lever 208 and the pitman rod 209. The locking of the keys and the usual correction are effected in the ordinary manner and are therefore not shown in the drawings.

The invention is in some respects an improvement of the machine shown in U. S. Patent 1,011,-617, and it should be understood that the various modifications and embodiments of the principles of the invention above enumerated are not to be considered as limitation thereof, the invention being susceptible of various other modifications, improvements and changes to correspond with particular local requirements and the convenience of the operator and without deviating from the spirit and scope of the invention as expressed in the claims hereunto appended.

I claim:

1. In a calculating machine in combination, a counting mechanism, operating members for the same, a proportional lever, adjustable connections between said operating members and said proportional lever, a displaceable multiplication table body, and means on said body for operative engagement with said connections.

2. In a calculating machine, counting member, an operating member therefor, a swinging lever, a link connected at one end to said operating member and slidably connected at its other end to said swinging lever, manipulative means for shifting the latter end of said link, and means for guiding said link to maintain its point of connection with said lever constant as the latter swings.

3. In a calculating machine, counting mechanism, an operating member therefor, a swinging lever, having an arcuate slot therein, a link having one end pivoted to said operating member at the center of curvature of said slot, means on the other end of said link slidably engaging said slot, and manipulative means adapted to engage said link to adjust the end thereof in said slot, said link having differently inclined guide surfaces engaged by said manipulative means for maintaining the position of the end of said link connected with said slot in substantially the same position in said slot as said lever swings.

4. In a calculating machine, a register operating rack bars therefor, a proportional lever, driving rack bars operated thereby and arranged parallel to said operating rack bars, a plurality of shafts, said register and said shafts being arranged transversely to said rack bars, gears connecting said driving rack bars to said shafts, disengageable pinions adapted to connect said operating rack bars to any of said shafts, and manipulative means for selectively moving said pinions to operative position.

5. A calculating machine as specified in claim 4, in which said gears are adapted to be shifted along said shafts to connect any one of said driving rack bars therewith, in combination with means including a multiplication-table body for shifting said gears.

6. A calculating machine as specified in claim 4, in which said gears are adapted to be shifted along said shafts to connect any one of said driving rack bars therewith, in combination with a multiplication-table body having projections thereon corresponding in length to the digits of the products of multiplication of the numbers 1 to 9, means for bringing selected projections to operative position, and means for shifting said gears to positions determined by the projections of said body in operative position.

7. A calculating machine as specified in claim 4, in which said gears are adapted to be shifted along said shafts to connect any one of said driving rack bars therewith, means yieldably holding said gears in one extreme position, a multiplication-table body having projections corresponding in length to the products of the numbers 1 to 9, means for adjusting said mulitplication-table body to bring a selected group of projections to operative position, said gears having abutments cooperating with said projections and means for moving said body toward said gears to cause the projections in operative position to engage said abutments and shift said gears to selected driving rack bars.

8. A calculating machine as specified in claim 4, in which said gears are adapted to be shifted along said shafts to connect any one of said driving rack bars therewith, in combination with a multiplication-table body having projections thereon corresponding in length to the digits of the products of multiplication of the numbers 1 to 9, means for bringing selected projections to operative position, said gears having abutments cooperating with said projections and means for yieldably moving said gears to press said abutments against the projections of said body in operative position to engage said gears with selected driving rack bars.

9. A calculating machine as specified in claim 4, in which said gears are adapted to be shifted along said shafts to connect any one of said driving rack bars therewith, in combination with a multiplication-table body having projections thereon corresponding in length to the digits of the products of multiplication of the numbers 1 to 9, means for bringing selected projections to operative position, said gears having abutments cooperating with said projections and means for yieldably moving said gears to press said abutments against the projections of said body in operative position to engage said gears with selected driving rack bars, said last mentioned means comprising elongated, round hubs on said gears having circumferential ridges, a shaft arranged transversely to said hubs, toothed wheels loosely mounted on said shaft adjacent each hub and engaging the ridges of said hubs, yieldable connections between said toothed wheels and said shaft, and means for rocking said shaft.

10. In a calculating machine, a counting device, operating members therefor, a proportional lever driving mechanism, manipulative means for selectively connecting said operating members with said driving mechanism in accordance with the digits of a multiplicand, and manipulative means for modifying said connections to correspond with the digits of the products of a multiplier and the digits of said multiplicand.

11. A calculating machine as defined in claim 10, in which said last mentioned means comprises a multiplication-table body having projections thereon corresponding in length to the units and tens digits of the products of the numbers 1 to 9, said projections being arranged in rows each comprising the products of one number by all the other numbers 1 to 9, means for moving said multiplication-table body transversely to said rows, and means for moving said body parallel to said rows to bring the units and tens projections successively into operative position.

12. In a calculating machine, counting mechanism, operating members therefor, a proportional lever driving mechanism, means for connecting any of said operating members to any of the points on said proportional lever having movements corresponding to the values 1 to 9, and a dual control for said last mentioned means comprising manipulative means for setting a multiplicand and manipulative means for setting a multiplier, said dual control being adapted to effect the connection of said operating members with said proportional lever in accordance with the products of the digits of the multiplier and the multiplicand.

13. In a calculating machine, a set of driving rack bars, a shaft arranged transversely with respect to said rack bars, a gear shiftably but non-rotatably mounted on said shaft and adapted to engage any one of said rack bars, an elongated hub on said gear having a corrugated periphery, a toothed wheel arranged on an axis perpendicular to said shaft and engaging the corrugations of said hub, and means whereby said toothed wheel can be rotated.

14. A calculating machine as specified in claim 13, in which said toothed wheel is rotatably mounted on an actuating shaft and yieldably connected thereto by a spring, in combination with an adjustable device having projections of different lengths adapted to abut said hub and thereby determine the extent of movement imparted to said gear by said toothed wheel.

15. In a calculating machine, a counting wheel, an operating rack bar therefor, a set of nine pinions of uniform diameter arranged along said rack bar and normally disengaged therefrom, driving means for imparting rotative movements to said pinions of different angular extents respectively corresponding to the values 1 to 9, and a row of keys for selectively connecting said pinions with said rack bar.

16. In a calculating machine as specified in claim 15, means for modifying the angular movements imparted to said pinions in accordance with the products of the digits which they represent and a multiplier digit.

17. In a calculating machine, a proportional lever driving device, a crank, and means for connecting said crank with said driving device comprising a pair of links connected with said crank so as to to be reciprocated alternately thereby, and means for connecting one link or the other with said driving device, in dependence upon the direction of rotation of said crank.

18. In a calculating machine, a proportional lever driving device, a crank, and means for connecting said crank with said driving device comprising a disk connected with said crank so as to be rotated thereby, a pair of links pivoted to diametrically opposite points on said disk, and means for connecting one link or the other with said driving device in dependence upon the direction of rotation of said crank.

19. A calculating machine in accordance with claim 18 in which the means for alternatively connecting said links with said driving device comprises a pair of spring pressed pins on said disk adapted to engage the respective links to move them into engagement with said driving device and then to pass under said links upon further rotation of said disk.

20. In a calculating machine, a set of longitudinally slidable driving members, means for displacing said members through different extents corresponding to the values 1, 2, 3, 4, 5, 6, 7, 8 and 9, a set of longitudinally slidable operating members parallel to said driving members, means for selectively connecting said members to effect a differential movement of said operating members, a register carriage, shiftable transversely to the movement of both of said sets of members, a shaft in said carriage extending transversely to the movement of said members, and numeral wheels on said shaft operated by said operating members.

21. In a calculating machine in accordance with claim 20, a multiplication table body for varying the connections between said operating members and said driving members to change the values of the proportional movements imparted to said operating members in accordance with the units and tens of the product of a multiplier digit and multiplicand digits.

22. In a calculating machine, a set of longitudinally slidable driving members, means for displacing said members through different extents corresponding to the values 1, 2, 3, 4, 5, 6, 7, 8 and 9, a set of longitudinally slidable operating members, driving connections between said driving members and said operating members, a register carriage shiftable transversely to the movement of said operating members, a shaft in said carriage extending transversely to the movement of said operating members, numeral wheels on said shaft operated by said operating members, and key actuated means determining the motion imparted to said operating members by said driving members.

23. In a calculating machine, a register, a set of longitudinally slidable driving rack bars, means for displacing said rack bars through different extents corresponding to the values 1, 2, 3, 4, 5, 6, 7, 8 and 9, a second set of longitudinally slidable rack bars for operating said register, said register being movable transversely to said two sets of rack bars, a plurality of shafts arranged transversely to said two sets of rack bars and geared to said driving rack bars, gear wheels displaceably and unrotatably mounted on each of said shafts adjacent each operating rack bar, and means for selectively moving said wheels longitudinally of said shafts for selectively connecting said shafts with said operating rack bars.

24. In a calculating machine, a set of longitudinally slidable driving members, a proportional lever for imparting different extents of movement to said driving members, a set of longitudinally slidable operating members, a register operated by said operating members and displaceable transversely to said driving and operating members, adjustable connections between said driving and operating members, a displaceable multiplication table body, and means on said body for adjusting said connections.

25. In a calculating machine, a proportional movement driving mechanism, a register comprising a plurality of numeral wheels mounted on a common shaft, longitudinally slidable operating members for the respective numeral wheels, and means comprising a keyboard for selectively connecting said operating members with different points on said proportional movement driving mechanism having movements corresponding to the values 1 to 9 inclusive.

26. In a calculating machine, a set of longitudinally slidable driving members, means for imparting proportional movements to said driving members according to the values 1, 2, 3, 4, 5, 6, 7, 8 and 9, a set of longitudinally slidable numeral wheel operating members, arranged adjacent said set of driving members, a register carriage, numeral wheels mounted rotatably on a common shaft in said register carriage, said shaft and said carriage being movable in common transversely to said driving and operating members, connecting means adapted to transmit movement from any of said driving members to any of said numeral wheel operating members, and a keyboard controlling said connecting means.

27. In a calculating machine, a set of longitudinally slidable driving members, means for imparting proportional movements to said driving members according to the values 1, 2, 3, 4, 5, 6, 7, 8 and 9, a set of longitudinally slidable numeral wheel operating members, arranged behind said set of driving members, a register carriage, numeral wheels mounted rotatably on a common shaft in said register carriage, said shaft and said carriage being movable in common transversely to said driving and operating members, connecting means adapted to transmit movement from any of said driving members to any of said numeral wheel operating members, and a keyboard controlling said connecting means.

GUSTAV MEZ.